3,655,662
PROCESS FOR THE MANUFACTURE OF DIHALO-GENTRIAZINE DERIVATIVES
Karl Seitz, Oberwil, Basel-Land, Guenter Klahre, Reinach, Basel-Land, and Henri Riat, Arlesheim, Switzerland, assignors to Ciba Limited, Basel, Switzerland
No Drawing. Filed Aug. 20, 1969, Ser. No. 851,732
Claims priority, application Switzerland, Sept. 10, 1968, 13,510/68
Int. Cl. C07d 55/48
U.S. Cl. 260—248 CS                               7 Claims

ABSTRACT OF THE DISCLOSURE

Process for the manufacture of dihalogentriazine derivatives by condensation of cyanuric halides with alcohols in the presence of inorganic phosphates.

---

It has been proposed to react trihalogen-triazines, for example, cyanuric chloride or cyanuric bromide, with an alcohol or phenol in a manner such that a halogen atom is replaced by an ether residue. This can be carried out, for example, by reacting the trihalogen-triazine with the desired alcohol in the presence of an agent capable of binding acid such, for example, as sodium bicarbonate, there being used as a medium, a mixture of water and an excess of the appropriate alcohol. In the case of numerous alcohols this process gives unsatisfactory results. Moreover, the reaction temperature must be kept within narrow limits in order to avoid hydrolysis, the copious evolution of carbon dioxide, and excessive foaming.

The condensation can also be carried out by introducing a solution of a sodium alcoholate dropwise into a solution of cyanuric chloride in benzene. However, working with alkali metal alcoholates is a considerable technical complication.

There has also been described a process in which an inert gas which continuously removes the hydrogen halide formed is passed continuously through a solution of the two reactants in toluene. It is, however, necessary to work at high temperatures with combustible solvents, and the formation of large amounts of gases that cause corrosion leads to additional problems.

Finally, it is also known to carry out the condensation in a wholly organic medium, for example, acetone, with the use of an organic base such, for example, as collidine. In this case, also, working with an organic solvent and the high cost and toxicity of bases such as collidine is technically unfavourable.

The present invention is based on the observation that the aforesaid disadvantages can in many cases be avoided by carrying out the reaction of the alcohol with the cyanuric halide in the presence of a phosphate or polyphosphate or a mixture thereof, and preferably in the absence of water. As a solvent for the trihalogen-triazine there may be used an excess of the alcohol to be reacted therewith. As alcohols there may be mentioned primary or secondary monohydric alcohols.

All the above-mentioned known processes have in common the tendency of making it possible to work in a homogeneous phase. It is all the more surprising that by the process of the present invention the desired condensation products can be obtained in a heterogeneous phase in a technically simple manner and in many cases with considerably better yields.

The present invention therefore provides a process for the manufacture of condensation products of the formula

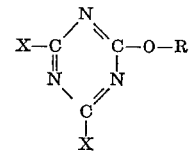

(1)

in which X represents a chlorine or bromine atom, and R represents an aliphatic, araliphatic or cycloaliphatic residue, containing at least 2 carbon atoms, which comprises reacting a 2,4,6-trichloro- or 2,4,6-tribromo-1,3,5-triazine with an aliphatic, araliphatic or cycloaliphatic alcohol, containing at least 2 carbon atoms in the presence of a preferably anhydrous, inorganic, phosphate or polyphosphate or a mixture of such inorganic phosphates, and preferably in the absence of water.

As phosphates there may be mentioned, for example, primary, secondary or tertiary alkali or alkaline earth metal phosphates or optionally pyro-phosphates, for example, $NH_4H_2PO_4$, $NaH_2PO_4$, $KH_2PO_4$, $Mg(H_2PO_4)_2$, $Ca(H_2PO_4)_2$, $(NH_4)_2HPO_4$, $Na_2HPO_4$, $MgHPO_4$,

$NaNH_4HPO_4$, $KNH_4HPO_4$, $Na_3PO_4$, $K_3PO_4$, $NaCaPO_4$, $NH_4MgPO_4$, $K_2H_2P_2O_7$ or $MgP_2O_7$. There is advantageously used a phosphate or mixture of phosphates, that exhibits in water a pH-value within the range of from 5 to 10, that is to say, for example, in a proportion of 1.5 mols for each mol of trihalogen-triazine, so that the non-reacting portion of the phosphate together with the phospate converted by the splitting off of hydrogen halide acts as a buffer system. The quantity and composition of the phosphate or mixture of phosphates used must be so chosen that no strongly acid reaction takes place during the reaction.

As alcohols for use in the condensation of the invention there may be mentioned a very wide variety, for example:

Ethanol, propanol, butanol, isobutanol, pentanol, isopentanol, 2-methyl-butanol-(1), hexanol, 2,2-dimethyl-pentanol-(1), 2-chlorethanol, 3-chloropropanol-(1), 2-methoxy-ethanol, 2-ethoxy-ethanol, 2-propoxy-ethanol, 2-n-butoxy-ethanol, 2- or 3-methoxy-propanol-(1), 3-ethoxy-propanol-(1), 3-methoxy-butanol-(1), 2-(2-methoxy-ethoxy)-ethanol, 2-(2-ethoxy-ethoxy)-ethanol, 2-ethylmercapto-ethanol, 2-phenoxy-ethanol, cyclohexyl-methanol, 2-hydroxyethyl acetate, tetrahydrofurfuryl alcohol, 2-butene-1-ol, allyl alcohol, propargyl alcohol, glycollic acid;

Isopropanol, sec. butanol, hexanol-(2), 1-methoxy-propanol-(2), 1,3-diethoxy-propanol-(2), 3-methyl-butanol-(2), pentanol-(3), cyclopentanol, cyclohexanol, 2-methyl-cyclohexanol, 3-hydroxy-tetrahydrofuran;

Benzyl alcohol, ortho-hydroxybenzyl alcohol, anisyl alcohol or cinnamyl alcohol.

As mentioned above, it is advantageous to use the alcohol also as a solvent, that is to say, in an excess such that the reaction mixture is still stirrable. If desired, there may also be added an organic solvent that is inert, that is to say, does not take part in the reaction, and is preferably miscible with water. The reaction is advantageously carried out at room temperature or at a moderately raised temperature, that is to say, preferably within the range of from 20 to 70° C., and the conditions must be so chosen that the formation of the di-condensation product is substantially prevented. The process is advantageously carried out, while stirring, in an apparatus that prevents the access of moisture. The condensation is terminated as soon as the presence of cyanuric chloride or cyanuric bromide can no longer be detected, which is generally the case after a period of from 2 to 7 hours.

The isolation of the reaction products obtained can be effected in a simple manner by discharging the reaction mixture into water, whereby the condensation product separates out either as an oil or as a precipitate. After being separated, it can be further used immediately or after filtration or after distillation. In many cases the crude reaction mixture, without being discharged into water, may be used directly for further reactions. Another technical advantage is that generally it is not necessary to use any additional organic solvent, and that the reaction can be carried out merely in an excess of the alcohol used for the reaction.

The condensation products of the Formula 1 obtained by the process of the invention are suitable for a very wide variety of uses, and especially as intermediate products for the manufacture of dyestuffs. At room temperature some of them are oils and others are solid compounds.

The following examples illustrate the invention, the parts and percentages being by weight:

EXAMPLE 1

300 parts of ethylene glycol monoethyl ether are placed in a sulphation flask. While stirring well there are introduced at room temperature in succession 213 parts of anhydrous disodium phosphate and 185 parts of cyanuric chloride. The reaction mixture is then heated at 40 to 45° C. for 3 to 4 hours. The resulting thinly liquid suspension is poured into 1500 parts of water, while stirring. The aqueous phase has a pH-value of 5.6. By means of a separating funnel, the 2,4-dichloro-6-(ethoxy-ethoxy)-1,3,5-triazine is then separated in the form of a heavy colourless oil. The yield of this condensation product, which is sufficiently pure for further reactions, is about 204 parts (=85% of the theoretical yield). For purification the oil may be further dried and distilled in a high vacuum. It boils at 103 to 105° C. under 0.03 mm. mercury pressure.

EXAMPLE 2

By using 300 parts of ethylene glycol monomethyl ether, instead of 300 parts of ethylene glycol monoethyl ether, and otherwise proceeding in the manner described in Example 1, there is also obtained in good yield 2,4-dichloro-6-(methoxy-ethoxy)-1,3,5-triazine, which boils at 79° C. under 0.01 mm. mercury pressure.

EXAMPLE 3

241 parts of anhydrous disodium phosphate and 185 parts of cyanuric chloride are strewn on to 240 parts of n-propanol in a beaker at room temperature. Without supplying external heat, the temperature of the reaction mixture is allowed to rise from room temperature to 30 to 35° C., and the latter temperature is maintained for 2 to 3 hours by occasional cooling with ice. When the exothermic reaction has subsided, the reaction mixture is poured onto ice-water, and the resulting 2,4-dichloro-6-n-propoxy-1,3,5-triazine is extracted with ether. After washing the mixture with water and drying it over anhydrous sodium sulphate, the ether is evaporated in vacuo, and the oil that remains behind (about 183 parts=88% of the theoretical yield) may be distilled for further purification. It boils at 61° C. under 0.04 mm. mercury pressure.

EXAMPLE 4

250 parts of isopropanol are placed in a sulphation flask. There are then introduced in succession, while stirring well and at room temperature, 213 parts of anhydrous disodium phosphate and 185 parts of cyanuric chloride. The reaction mixture is then heated at 40 to 45° C. for 5 hours. The oily suspension is then poured, while stirring, into 1500 parts of water having a temperature of 15° C., and the resulting 2,4-dichloro-6-isopropoxy-1,3,5-triazine is allowed to settle out in a separating funnel. The crude product is taken up in ether, and the mixture is dried over anhydrous sodium sulphate. After distilling off the ether, there remain behind about 172 parts of a colourless oil (=83% of the theoretical yield), which distills without decomposition between 121 and 122.5° C. under 17 mm. mercury pressure.

By using in this example, instead of cyanuric chloride, an equivalent quantity of cyanuric bromide, there is obtained after working up 2,4-dibromo-6-isopropoxy-1,3,5-triazine.

EXAMPLE 5

300 parts of sec. butanol are placed in a sulphation flask. While stirring well at room temperature, there are introduced in succession 213 parts of anhydrous disodium phosphate and 185 parts of cyanuric chloride. The reaction mixture is heated at 42 to 45° C. for 5 hours, and then the oily suspension is poured, while stirring, into 1500 parts of water having a temperature of 15° C., and the resulting 2,4 - dichloro-6-(1-methyl-propoxy)-1,3,5-triazine is allowed to settle out in a separating funnel. The crude product is taken up in ether and the mixture is dried over anhydrous sodium sulphate. After distilling off the ether, there remain behind about 204 parts of a colourless oil (=92% of the theoretical yield), which distills without decomposition between 126 and 128° C. under 16 mm. mercury pressure.

EXAMPLE 6

To 148 parts of tert. butanol in a sulphation flask are added 213 parts of anhydrous disodium phosphate and 185 parts of cyanuric chloride, and the whole is heated to 50 to 52° C. In the course of 2 hours there are then introduced dropwise 135 parts of ethylene glycol monoethyl ether, and the temperature of the reaction mixture is maintained at 50 to 52° C. for a further 5 hours. The thinly liquid suspension is then poured into 4000 parts of water having a temperature of 15° C., and the resulting 2,4-dichloro-6-(ethoxy-ethoxy)-1,3,5-triazine is separated as a heavy oil in a separating funnel. The crude product is taken up in ether, and the mixture is dried over anhydrous sodium sulphate. After evaporating the ether, there remain behind about 173 parts of a colourless oil (=73% of the theoretical yield), which distills between 146 and 148° C. under 8 mm. mercury pressure.

EXAMPLE 7

352 parts of pentanol-(3) are placed in a sulphation flask. While stirring well, there are then introduced at room temperature in succession 213 parts of anhydrous disodium phosphate and 185 parts of cyanuric chloride. The reaction mixture is heated at 42 to 45° for 6 hours, and the resulting suspension is then poured, while stirring, into 4000 parts of water having a temperature of 10° C. The heavy oil is separated from the aqueous phase in a separating funnel, and is taken up in ether and the mixture is dried over anhydrous sodium sulphate. After evaporating the ether, the 2,4-dichloro - 6 - (1-ethyl-propoxy)-1,3,5-triazine is distilled in vacuo. It boils at 126 to 127° C. under 8 mm. mercury pressure. The yield is 68% of the theoretical yield.

EXAMPLE 8

480 parts of isopropanol are placed in a sulphation flask. While stirring well there are then introduced at room temperature in succession 246 parts of anhydrous trisodium phosphate, 180 parts of anhydrous monosodium phosphate and 369 parts of cyanuric chloride. The reaction mixture is then heated at 40 to 45° C. for 5 hours. At the end of this period the oily suspension is poured, while stirring, into 3000 parts of water at room temperature, and the oil is separated from the aqueous phase in a separating funnel, the aqueous phase having a pH-value of about 5. The crude product is taken up in ether, and the mixture is dried over anhydrous sodium sulphate. After distilling off the ether, there are obtained about 286 parts of 2,4-dichloro-6-isopropoxy-1,3,5-triazine, which corresponds to 70% of the theoretical yield.

EXAMPLE 9

300 parts of 1-methoxy-propanol-(2) are placed in a sulphation flask. 284 parts of anhydrous disodium phosphate and 184 parts of cyanuric chloride are added, while stirring, and the whole is heated at 55 to 60° C. for 3 hours. When the reaction sets in, cooling may be necessary. The whole is allowed to cool, is then filtered, and washed with ice-water. The oil present in the filtrate is separated. The aqueous layer is extracted twice with ether, and the combined oil-containing ether fractions are dried with anhydrous disodium phosphate. After filtration, and evaporation of the ether, an oil remains behind that can be distilled without decomposition at 68 to 70° C. under 0.07 mm. mercury pressure.

EXAMPLE 10

306 parts of tetrahydrofurfuryl alcohol and 213 parts of anhydrous disodium phosphate are mixed together in a sulphation flask. 184 parts of cyanuric chloride are added, and the whole is stirred for 5 hours of 40 to 45° C. After being cooled, the reaction mixture is poured into 2500 parts of ice-water and is then extracted with ether. The ethereal solution is dried with anhydrous disodium phosphate. After evaporating the ether, an oil remains behind which can be distilled at 122 to 124° C. under 0.3 mm. pressure of mercury without decomposition. The yield is 150 parts (=60% of the theoretical yield).

EXAMPLE 11

402 parts of 2-(β-ethoxy)-ethoxy-ethanol, 213 parts of anhydrous disodium phosphate and 184 parts cyanuric chloride are mixed together in a sulphation flask, and are maintained at 40° C. for 4 hours. After being cooled, the reaction mixture is poured into 2500 parts of water, and the resulting oil is extracted with chloroform. After drying the chloroform solution over anhydrous disodium phosphate, the chloroform is evaporated, and there remain behind 161 parts of a viscous liquid, which can be distilled at 112 to 115° C. under 0.1 mm. mercury pressure without decomposition.

What we claim is:

1. In a process for reacting a 2,4,6-trichloro- or 2,4,6-tribromo-1,3,5-triazine with an alcohol to obtain the dihalogentriazine condensation product, the improvement therein which comprises conducting the reaction at a temperature of from 20 to 70° C. in the presence of an inorganic phosphate, pyrophosphate or mixture thereof.

2. A process according to claim 1 in which the reaction medium is substantially anhydrous.

3. A process according to claim 1 in which the phosphate or phosphate mixture employed is characterized by a pH in water of from 5 to 10.

4. A process according to claim 1 in which there is employed from 1.3 to 1.7 moles of said phosphate per mole of trihalogen-triazine.

5. A process according to claim 1 in which the phosphate is disodium hydrogen phosphate.

6. A process according to claim 1 in which the phosphate is a mixture of trisodium phosphate and monosodium dihydrogen phosphate.

7. A process according to claim 1 in which the reaction is conducted at a temperature of from 20 to 70° C.

References Cited
UNITED STATES PATENTS

| | | | |
|---|---|---|---|
| 2,751,384 | 6/1956 | Coover, Jr. et al. | 260—248 |
| 3,158,450 | 11/1964 | D'Alelio | 260—248 X |
| 3,213,093 | 10/1965 | Papp et al. | 260—248 X |
| 3,525,745 | 8/1970 | Anderson | 260—248 |

JOHN M. FORD, Primary Examiner